(12) United States Patent
Inoue et al.

(10) Patent No.: US 11,939,197 B2
(45) Date of Patent: Mar. 26, 2024

(54) FORKLIFT-TRUCK REMOTE OPERATION SYSTEM

(71) Applicant: KABUSHIKI KAISHA TOYOTA JIDOSHOKKI, Kariya (JP)

(72) Inventors: Junji Inoue, Aichi-ken (JP); Koji Hika, Aichi-ken (JP); Hironobu Okamoto, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 694 days.

(21) Appl. No.: 17/055,305

(22) PCT Filed: May 14, 2019

(86) PCT No.: PCT/JP2019/019026
§ 371 (c)(1),
(2) Date: Nov. 13, 2020

(87) PCT Pub. No.: WO2019/225390
PCT Pub. Date: Nov. 28, 2019

(65) Prior Publication Data
US 2021/0171329 A1 Jun. 10, 2021

(30) Foreign Application Priority Data
May 24, 2018 (JP) .................................. 2018-099843

(51) Int. Cl.
*B66F 9/06* (2006.01)
*G05D 1/00* (2006.01)
(Continued)

(52) U.S. Cl.
CPC ........... *B66F 9/063* (2013.01); *G05D 1/0038* (2013.01); *G05D 1/0212* (2013.01); *G06V 20/56* (2022.01);
(Continued)

(58) Field of Classification Search
CPC .... B66F 9/063; G05D 1/0038; G05D 1/0212; G05D 2201/0216; H04N 7/183
See application file for complete search history.

(56) References Cited

U.S. PATENT DOCUMENTS

| 5,208,753 A | * | 5/1993 | Acuff | B66F 9/0755 |
| | | | | 414/633 |
| 2007/0269299 A1 | * | 11/2007 | Ross | B66F 9/063 |
| | | | | 414/347 |
| 2017/0285643 A1 | * | 10/2017 | Ichinose | G05D 1/024 |

FOREIGN PATENT DOCUMENTS

JP 2014-011518 A 1/2014

* cited by examiner

*Primary Examiner* — Gertrude Arthur Jeanglaude
(74) *Attorney, Agent, or Firm* — Sughrue Mion, PLLC

(57) ABSTRACT

A forklift-truck remote operation system includes a forklift truck and a remote operation device. The forklift-truck remote operation system further includes: a camera mounted to the forklift truck and configured to capture an image of an area around the forklift truck; a display disposed in the remote operation device and configured to display the image captured by the camera; a pallet detector configured to perform image recognition processing of the image captured by the camera and detect a plurality of pallets; a display controller configured to control the display to display the image captured by the camera with an indication for pallet selection from the pallets detected by the pallet detector; and a travel controller configured to control the forklift truck to move to a position of the selected pallet.

5 Claims, 6 Drawing Sheets

(51) Int. Cl.
*G06V 20/56* (2022.01)
*H04N 7/18* (2006.01)
(52) U.S. Cl.
CPC ..... *H04N 7/183* (2013.01); *G05D 2201/0216* (2013.01)

FORKLIFT-TRUCK REMOTE OPERATION SYSTEM

CROSS-REFERENCE TO RELATED APPLICATION

This application is a National Stage of International Application No. PCT/JP2019/019026 filed on May 14, 2019, claiming priority based on Japanese Patent Application No. 2018-099843 filed on May 24, 2018, the contents of all of which are incorporated herein by reference in their entirety.

TECHNICAL FIELD

The present invention relates to a forklift-truck remote operation system.

BACKGROUND ART

A forklift truck may include a camera to grasp an environment around the forklift truck (for example, Patent literature 1).

CITATIONS LIST

Patent Literature

Patent literature 1: Japanese Patent Application Publication No. 2014-11518

SUMMARY OF INVENTION

Technical Problems

In the forklift-truck remote operation system, an operator operates a forklift truck to which a camera is mounted while watching a screen, but it is difficult to move the forklift truck to a position of a pallet.

The present invention is directed to providing a forklift-thick remote operation system that facilitates movement of a forklift truck to a position of a desired pallet.

Solutions to Problems

In the invention according to claim 1, a forklift-truck remote operation system includes a forklift truck including a vehicle communication part; and a remote operation device including an operation device communication part that is configured to communicate wirelessly with the vehicle communication part and used for remote operation of the forklift truck, wherein the forklift-truck remote operation system includes a camera mounted to the forklift truck and configured to capture an image of an area around the forklift truck; a display disposed in the remote operation device and configured to display the image captured by the camera; a pallet detector configured to perform image recognition processing of the image captured by the camera and detect a plurality of pallets; a display controller configured to control the display to display the image captured by the camera with an indication for pallet selection from the pallets detected by the pallet detector; and a travel controller configured to control the forklift truck to move to a position of the selected pallet.

In the invention according to claim 1, the plurality of pallets is detected through image recognition processing of the image captured by the camera, the image captured by the camera is displayed by the display, with the indication for pallet selection from the detected pallets, and the forklift truck moves to a position of a selected pallet. This facilitates the movement of the forklift truck to a position of a desired pallet.

As described in claim 2, in the forklift-truck remote operation system according to claim 1, the indication for pallet selection may include pop-up boxes corresponding to the respective detected pallets.

As described in claim 3, in the forklift-truck remote operation system according to claim 1, the indication for pallet selection may include highlighting of outlines of the detected pallets.

As described in claim 4, in the forklift-truck remote operation system according to any one of claims 1 to 3, the display controller further controls the display to display an enlargement of an area around the selected pallet on a sub-screen.

Advantageous Effects of Invention

The present invention facilitates movement of a forklift truck to a position of a desired pallet.

DESCRIPTION OF EMBODIMENT

The following describes an embodiment of the present invention with reference to the drawings.

Figure 1:
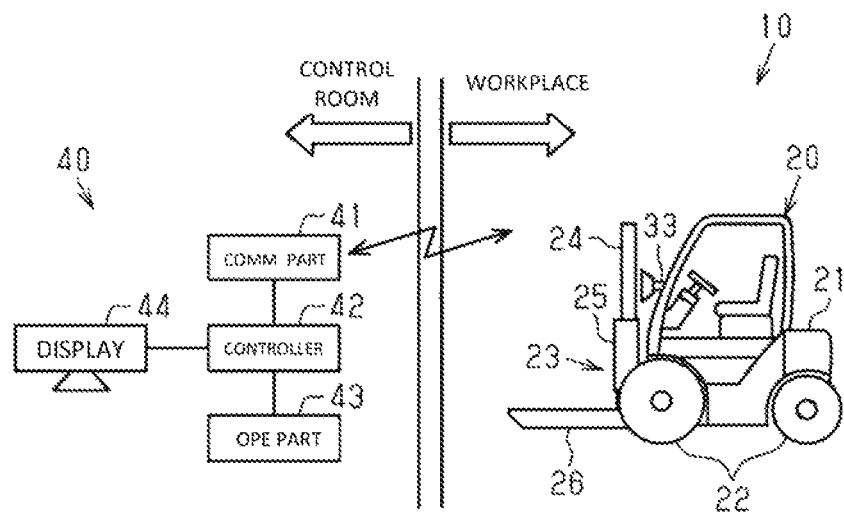
FIG. 1 is a schematic view of a forklift-truck remote operation system.

As shown in FIG. 1, a forklift-truck remote operation system 10 includes a forklift truck 20 and a remote operation device 40 used for remote operation of the forklift truck 20. The forklift truck 20 is placed in a workplace. The remote operation device 40 is disposed in a control room. The remote operation device 40 is used in the control room to remotely control the forklift truck 20 in the workplace.

Figure 2:
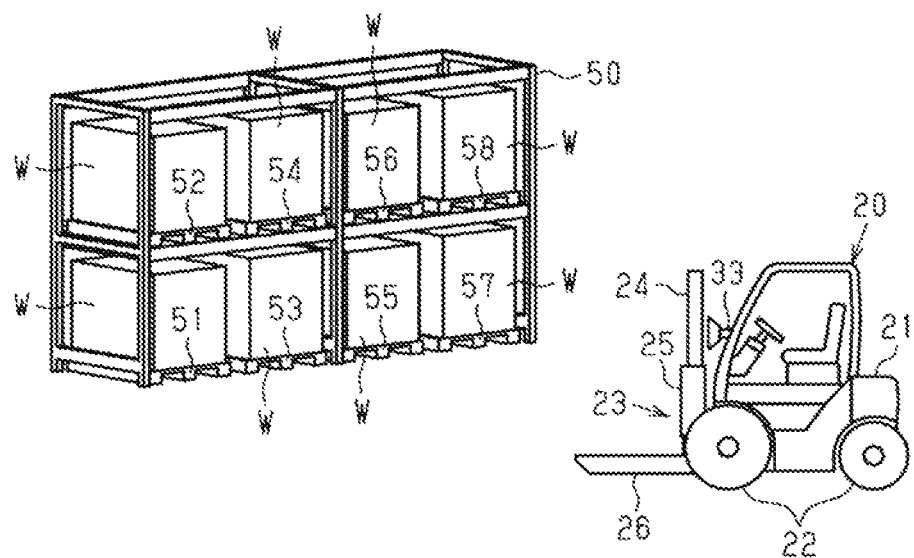
FIG. 2 is a schematic view for explaining a situation where a forklift truck and pallets are in a workplace.

As shown in FIG. 2, a rack 50 is installed in the workplace. The rack 50 allows pallets (51-58) and items W to be placed on two shelves of the rack 50. That is, one item W is placed on the pallet 51 on the bottom shelf, and above it, another item W is placed on the pallet 52 on the top shelf. Next to it, one item W is placed on the pallet 53 on the bottom shelf, and above it, another item W is placed on the pallet 54 on the top shelf. Next to it, one item W is placed on the pallet 55 on the bottom shelf, and above it, another item W is placed on the pallet 56 on the top shelf. Next to it, one item W is placed on the pallet 57 on the bottom shelf, and above it, another item W is placed on the pallet 58 on the top shelf. In this arrangement, an operator remotely controls the forklift truck 20 to pick up an item.

In FIG. 2, each of the pallets 51-58 has fork insertion holes, and a fork is inserted into the fork insertion holes.

As shown in FIG. 1, the forklift truck 20 includes wheels 22 on the front and the rear of a body 21. The body 21 includes a loading device 23. The loading device 23 performs item loading or unloading.

The loading device 23 includes a mast 24, a bracket 25, and a fork 26. The fork 26 is disposed on the mast 24 via the bracket 25 such that the fork 26 is movable in the up-down direction. In this embodiment, the forklift truck 20 is configured such that a driver can operate the forklift truck 20 while sitting, but the forklift truck 20 may be a driverless forklift truck not including a driver seat.

Further, the forklift truck 20 may be an engine forklift truck including an engine, an electric forklift truck including a power storage device and an electric motor, or a fuel cell forklift truck including a fuel cell and an electric motor. Alternatively, the forklift truck 20 may be a hybrid forklift truck including an engine, a power storage device, and an electric motor.

Figure 3:
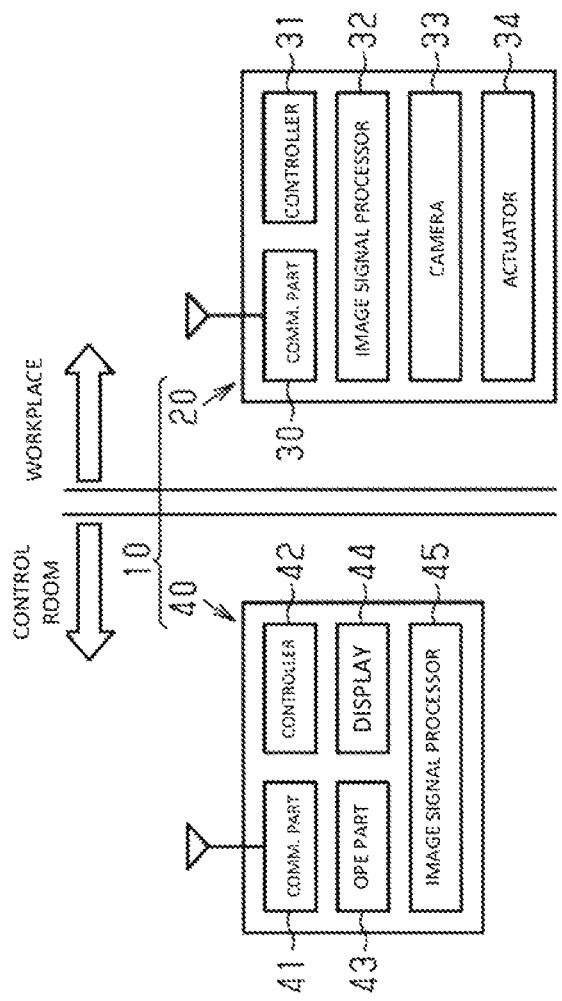
FIG. 3 is a block diagram of an electrical configuration of e forklift-truck remote operation system.

As shown in FIG. 3, the forklift truck 20 includes a wireless communicator 30 that serves as a vehicle communication part, a controller 31, an image signal processor 32, a camera 33, and an actuator 34. The camera 33 is mounted to the forklift truck 20 and configured to capture an image of an area around the forklift truck 20. Specifically, the camera 33 is attached to the bracket 25 and captures an image of a front view in a travelling direction of the forklift truck 20. The actuator 34 includes a travelling actuator and a loading actuator, and the loading actuator includes a tilting actuator and an elevating actuator. The travelling actuator steers and rotates the wheels 22.

The remote operation device 40 includes a wireless communicator 41 that serves as an operation device communication part, a controller 42, an operating part 43, a display 44, and an image signal processor 45. The operating part 43 adopts an operation system, such as the touch screen system, the mouse system, or the joystick system.

The wireless communicator 41 is capable of communicating wirelessly with the wireless communicator 30 of the forklift truck 20. That is, the wireless communicator 30 of the forklift truck 20 and the wireless communicator 41 of the remote operation device 40 are capable of communicating with each other.

When the operator performs a desired operation with the operating part 43 of the remote operation device 40, the controller 42 sends operation information to the forklift truck 20 via the wireless communicator 41. The wireless communicator 30 of the forklift truck 20 receives the operation information sent from the remote operation device 40, and the controller 31 activates the actuator 34 to perform a desired operation.

In contrast, the controller 31 of the forklift truck 20 sends an image captured by the camera 33 to the remote operation device 40 via the image signal processor 32 and the wireless communicator 30. The wireless communicator 41 of the remote operation device 40 receives the camera image sent from the forklift truck 20, and the controller 42 controls the display 44, via the image signal processor 45, to display the image. That is, the display 44 disposed in the remote operation device 40 is configured to display the image captured by the camera 33. The operator performs an operation while watching the image captured by the camera 33 on the display 44.

Figure 6A:
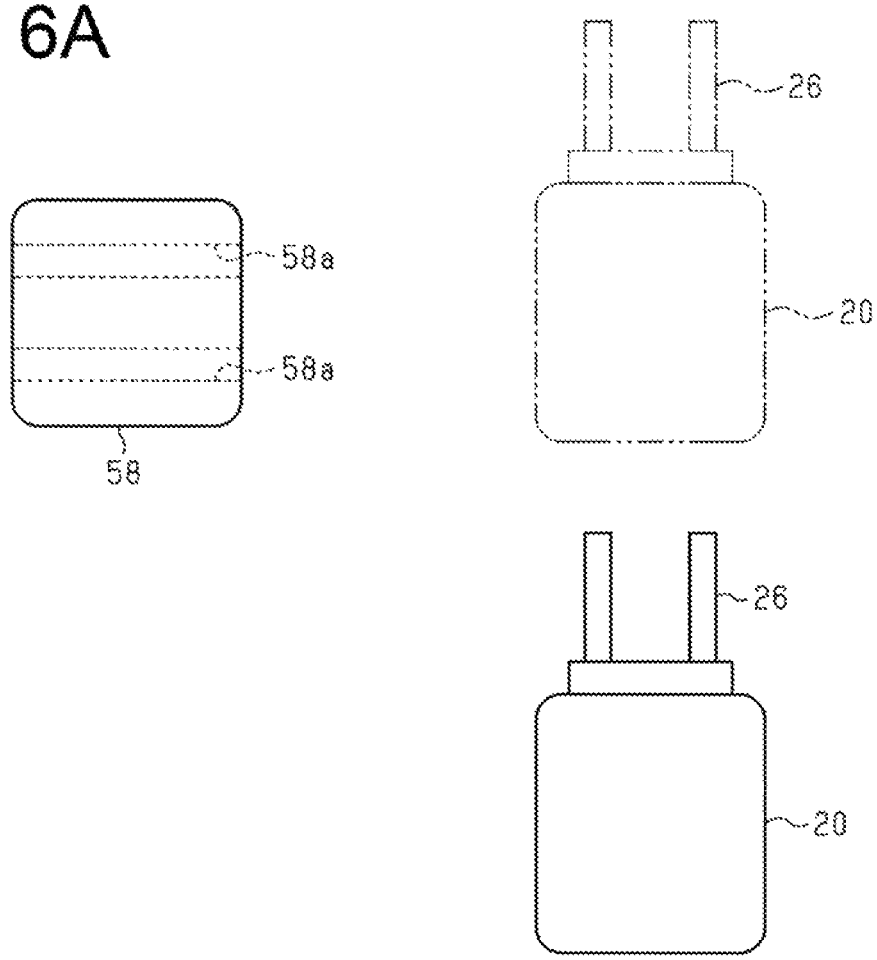
FIGS. 6A and 6B are schematic plan views that explain the operation.
Figure 6B:
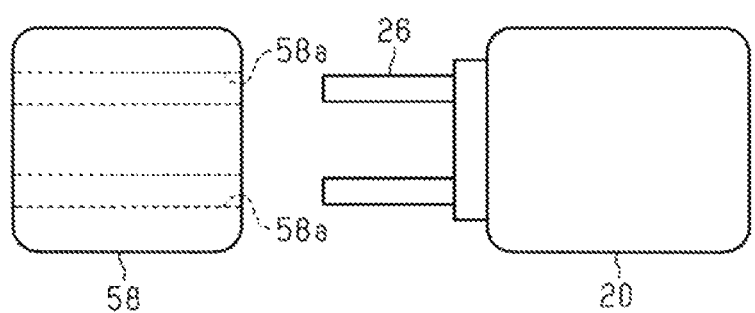

The forklift truck remote operation system 10 has a function for automatic control of the forklift truck 20. This automatic control function enables loading operation. Specifically, as shown in FIG. 6A, the forklift truck 20 is automatically controlled to approach a pallet selected by the operator, and as shown in FIG. 6B, the forklift truck 20 is automatically controlled to adjust its position so as to face the pallet, insert a fork into pallet holes, or lift the fork inserted into the pallet holes.

In FIG. 3, the controller 42 that serves as a pallet detector is configured to perform, by using the image signal processor 45, image recognition processing of the image captured by the camera 33 and detect the plurality of pallets 51-58. The controller 42 that serves as a display controller is configured to control the display 44 to display the image captured by the camera 33 with an indication for pallet selection from the detected pallets 51-58. The controller 42 that serves as a travel controller is configured to control the forklift truck 20 to move to a position of the selected pallet.

Next, the operation will be explained.

Figure 4:
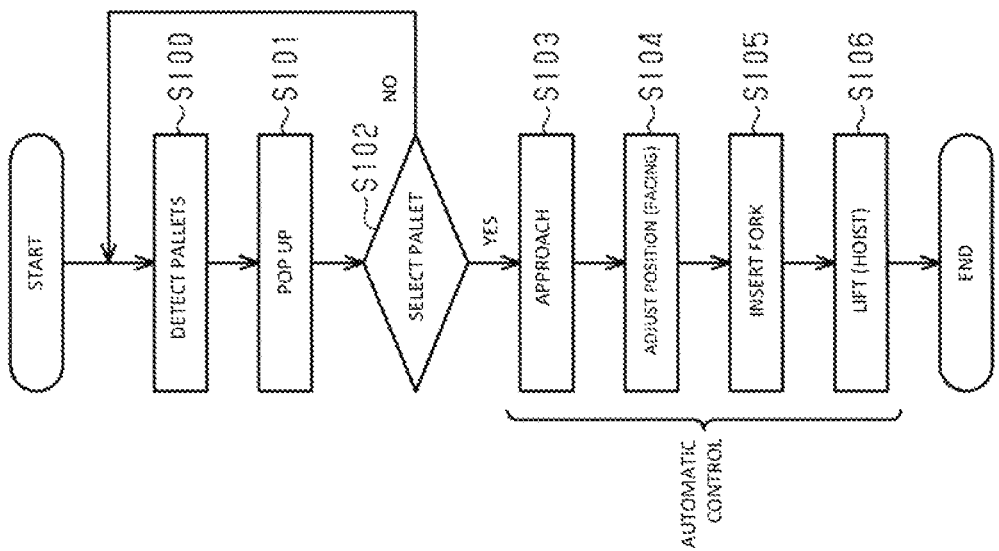
FIG. 4 is a flowchart for explaining an operation.

As shown in FIG. 4, the controller 42 of the remote operation device 40 performs image recognition and detects pellets on a screen in step S100. For example, the pallets are detected through image recognition of a pallet shape (a pallet outline, a pallet hole shape, and the like) from a camera image. In step S101, the controller 42 pops up selection boxes on the respective detected pallets. This makes it easy for an operator to select an item to be picked up.

Further, the controller 42 determines in step S102 whether a pallet to be worked has been selected by the operator, and the controller 42 makes a return to step S100 for detection of the pallets on the screen if any pallet has not been selected, and pops up the selection boxes on the respective detected pallets in step S101. That is, boxes respectively corresponding to the detected pallets are popped up.

After a pallet to be worked is selected by the operator from the detected pallets in step S102, the controller 42 makes a transition to step S103, and as the travel controller, controls the forklift truck 20 to approach the target pallet through automatic control in step S103, and adjusts a position of the forklift truck 20 in step S104 so that the forklift truck 20 faces the pallet. Further, the controller 42 performs control to insert the fork 26 into holes of the pallet in step S105 so that the pallet is lifted up in step S106.

Figure 5:
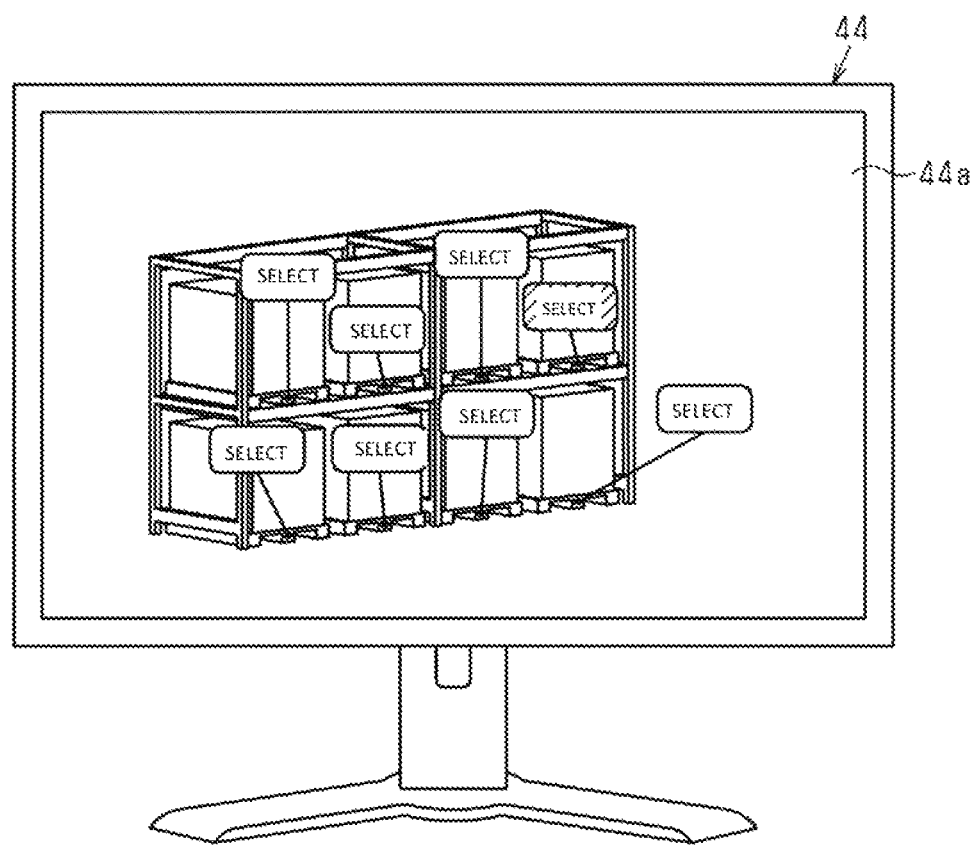
FIG. 5 is a view of a displayed screen image for explanation of the operation.

FIG. 5 shows information displayed on a screen 44a of the display 44.

In FIG. 5, the display 44 displays an image captured by the camera 33. Further, when the pallets are detected through processing in step S100 in FIG. 4, the selection boxes are popped up on the pallets detected through processing in step S101. Specifically, boxes indicating "select" are popped up corresponding to the respective detected pallets.

Then, the operator selects a pallet. For example, the operator moves the cursor to a box that corresponds to a pallet to be worked, and clicks it. For example, when the operator selects the box corresponding to the pallet 58, the box is colored and the forklift truck 20 drawn with a solid line in FIG. 6A is controlled to approach the pallet 58 as indicated with a dashed dotted line by the travel controller through automatic control. As shown in FIG. 6B, the forklift truck 20 then faces the pallet 58. After that, the pallet 58 is lifted up by the fork 26 inserted into holes 58a of the pallet 58.

In such a way, pallet detection is performed through image recognition processing, and boxes for pallet selection are popped up. Then, a transition to automatic control by the travel controller is performed when a box, which corresponds to a pallet to be worked, is selected by the operator. Then, the forklift truck automatically moves so as to face the pallet, and automatically inserts the fork into the pallet holes after confirmation of the positions of the pallet holes.

That is, a transition to automatic control by the travel controller is performed when boxes for pallet selection are popped up and a pallet to be worked is selected by an operator after pallets on a screen are detected through image recognition.

Accordingly, pallet selection is difficult if a plurality of pallets is placed in the vicinity, but the box pop-up enables safe pallet selection. Further, the box pop-up enables pallet recognition in an early stage.

More details are explained.

When a forklift-truck remote operation system, wherein a camera is mounted to a body, is operated by an operator watching a screen (image), it is difficult to move the forklift truck to a position of a pallet or insert a fork into pallet holes. That is, when a camera is mounted to a forklift truck and remote operation is performed by an operator watching an image, it is difficult (it takes time) to move the forklift truck to a position of a pallet to be worked. Further, when the operator controls the forklift tuck while watching the image, it is difficult (it takes time) to insert a fork into pallet holes. Accordingly, it is difficult to select a pallet to which an item is carried just by watching a camera image.

In this embodiment, detecting pallets through image recognition of a camera image and popping up boxes for pallet selection from the detected pallets facilitate pallet selection, travel to a pallet, movement to a pallet position, and fork insertion into pallet holes. That is, it does not only allow remote operation of a forklift truck by an operator watching an image of a camera mounted to the forklift truck, but facilitates movement of the forklift truck to a position of a pallet to be worked, so that time is reduced. Further, it does not only allow the operation by the operator watching the image, but facilitates fork insertion into holes of a pallet to be worked, so that time is reduced.

In FIG. 4, the process from the operation of approaching the target pallet in step S103 to the operation of lifting the pallet in step S106 is fully automated, but a task of automatic control (operation in each step) can be selected; for example, the step of fork insertion into pallet holes and subsequent steps may be performed by the operator while only the operation of approaching the target pallet is automated.

According to the aforementioned embodiment, the following effects can be achieved.

(1) The forklift-truck remote operation system 10 includes the forklift truck 20, which includes the wireless communicator 30 as a vehicle communication part, and the remote operation device 40, which includes the wireless communicator 41 as an operation device communication part that is configured to communicate wirelessly with the wireless communicator 30 as a vehicle communication part and is used for remote control of the forklift truck 20. The forklift-truck remote operation system 10 includes the camera 33 that is mounted to the forklift truck 20 and captures an image of an area around the forklift truck 20, the display 44 that is disposed in the remote operation device 40 and displays the image captured by the camera 33, and the controller 42. The controller 42 as a pallet detector performs image recognition processing of the image captured by the camera 33 and detects the plurality of pallets 51-58. The controller 42 as a display controller controls the display 44 to display the image captured by the camera 33 with an indication for pallet selection from the detected pallets. The controller 42 as a travel controller performs movement to a position of the selected pallet.

Accordingly, the plurality of pallets 51-58 is detected through image recognition processing of the image captured by the camera 33, and the image captured by the camera 33 is displayed on the display 44 with the indication for pallet selection from the detected pallets, so that the movement to the position of the selected pallet is performed. This facilitates the movement to a position of a desired pallet.

(2) The pop-up boxes that correspond to the respective detected pallets serve as an indication for pallet selection, so that pallet selection is facilitated.

The embodiment is not limited to the aforementioned embodiment, and may be embodied as follows.

The processing in FIG. 4 is performed by the controller 42 of the remote operation device 40 but may be performed by the controller 31 of the forklift truck 20.

The camera 33 may capture an image of any area, other than the front area from the forklift truck 20, such as the rear area from the forklift truck 20 in the traveling direction.

Figure 7:
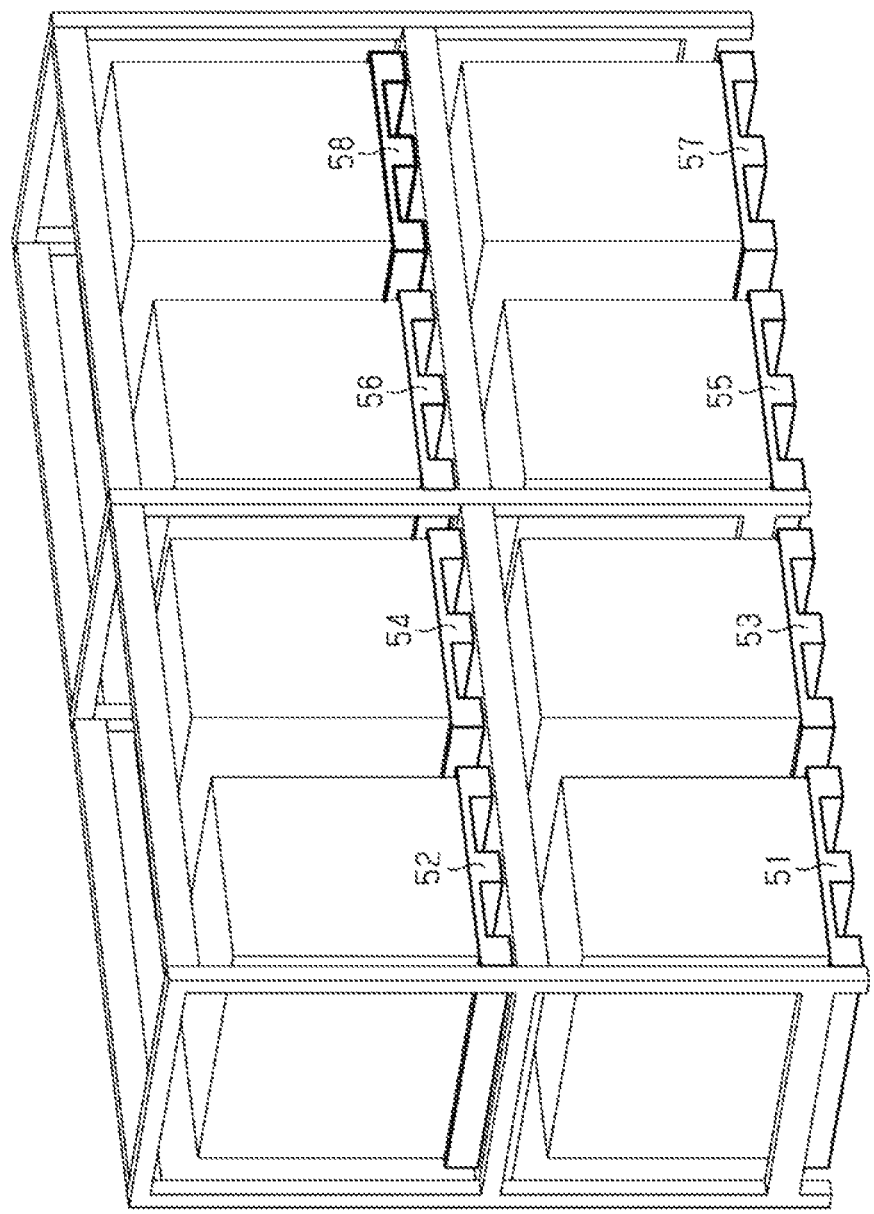
FIG. 7 is a view of a displayed screen image.

The shapes of the boxes as an indication for pallet selection may be any shape that facilitates selection by the operator, The indication for pallet selection may include any emphasis indication, other than pop-up, such as enlargement. Further, as shown in FIG. 7, the outline of an image-recognized pallet may be highlighted. In this case, the target pallet is selected by clicking the highlighted outline of a pallet to be worked. Specifically, in FIG. 7, the outlines of the detected pallets 51-58 are emphasized with a thick line, and the outline of the selected pallet 58 is further emphasized, for example, with a line thicker than the thick line. In such a way, the indication for pallet selection may include highlighting of the outlines of the detected pallets.

Figure 8:
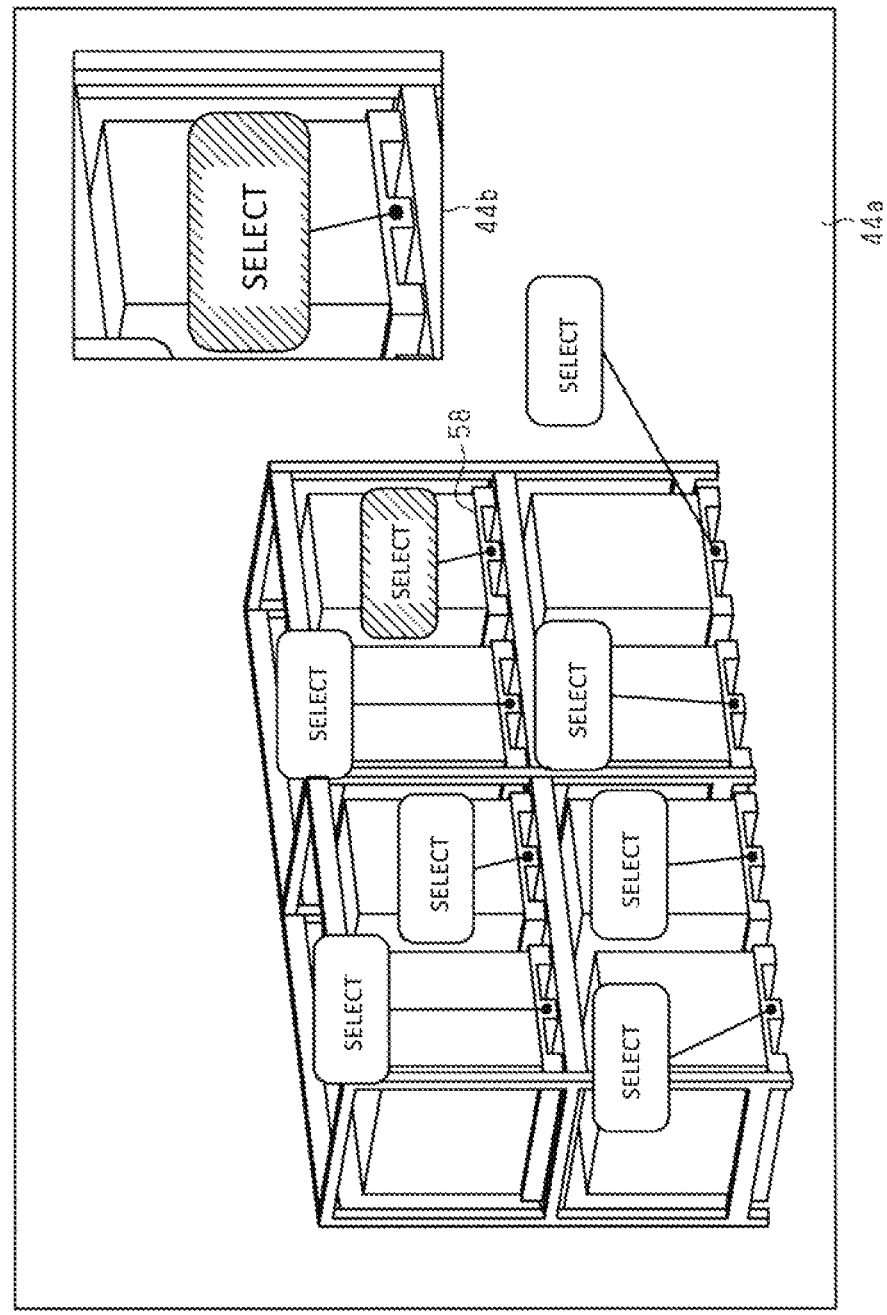
FIG. 8 is a view of a displayed screen image.

To facilitate identification of the pallet selected by the operator, for example, as shown in FIG. 8, a function to enlarge an area around the selected pallet on a sub-screen may be included. Specifically, in FIG. 8, the area around the selected pallet 58 is enlarged on a sub-screen 44b within the screen 44a. In such a way, the controller 42 as a display controller may further control the display 44 to display an enlargement of the area around the selected pallet as a sub-screen. Further, the boxes may change shapes when selected.

REFERENCE SIGNS LIST 10 forklift-truck remote operation system
20 forklift truck
30 wireless communicator
31 controller
33 camera
40 remote operation device
41 wireless communicator
42 controller
44 display
51-58 pallet

The invention claimed is:

1. A forklift-truck remote operation system comprising:
a forklift truck including a vehicle communication part; and
a remote operation device including an operation device communication part that is configured to communicate wirelessly with the vehicle communication part and used for remote operation of the forklift truck, wherein the forklift-truck remote operation system includes:
a camera mounted to the forklift truck and configured to capture an image of an area around the forklift truck;

a display disposed in the remote operation device and configured to display the image captured by the camera;

a pallet detector configured to perform image recognition processing of the image captured by the camera and detect a plurality of pallets;

a display controller configured to control the display to display the image captured by the camera with an indication for pallet selection from the pallets detected by the pallet detector; and a travel controller configured to control the forklift truck to move to a position of the selected pallet, wherein the indication for pallet selection includes pop-up boxes corresponding to the respective detected pallets.

2. The forklift-truck remote operation system according to claim 1, wherein the display controller further controls the display to display an enlargement of an area around the selected pallet on a sub-screen.

3. A forklift-truck remote operation system comprising:

a forklift truck including a vehicle communication part; and a remote operation device including an operation device communication part that is configured to communicate wirelessly with the vehicle communication part and used for remote operation of the forklift truck, wherein the forklift-truck remote operation system includes:

a camera mounted to the forklift truck and configured to capture an image of an area around the forklift truck;

a display disposed in the remote operation device and configured to display the image captured by the camera;

a pallet detector configured to perform image recognition processing of the image captured by the camera and detect a plurality of pallets;

a display controller configured to control the display to display the image captured by the camera with an indication for pallet selection from the pallets detected by the pallet detector; and a travel controller configured to control the forklift truck to move to a position of the selected pallet, wherein the indication for pallet selection includes highlighting of outlines of the detected pallets.

4. The forklift-truck remote operation system according to claim 3, wherein the display controller further controls the display to display an enlargement of an area around the selected pallet on a sub-screen.

5. A forklift-truck remote operation system comprising:

a forklift truck including a vehicle communication part; and a remote operation device including an operation device communication part that is configured to communicate wirelessly with the vehicle communication pan and used for remote operation of the forklift truck, wherein the forklift-truck remote operation system includes:

a camera mounted to the forklift truck and configured to capture an image of an area around the forklift truck;

a display disposed in the remote operation device and configured to display the image captured by the camera;

a pallet detector configured to perform image recognition processing of the image captured by the camera and detect a plurality of pallets;

a display controller configured to control the display to display the image captured by the camera with an indication for pallet selection from the pallets detected by the pallet detector; and a travel controller configured to control the forklift truck to move to a position of the selected pallet, wherein the display controller further controls the display to display an enlargement of an area around the selected pallet on a sub-screen.

* * * * *